United States Patent

Huemke et al.

Patent Number: 5,352,525
Date of Patent: Oct. 4, 1994

[54] WATER-THINNABLE COATING COMPOSITIONS

[75] Inventors: Klaus Huemke, Friedelsheim; Dieter Faul, Bad Durkheim; Ulrich Heimann, Muenster, all of Fed. Rep. of Germany

[73] Assignee: BASF Lacke + Farben AG, Muenster, Fed. Rep. of Germany

[21] Appl. No.: 25,335

[22] Filed: Feb. 25, 1993

[30] Foreign Application Priority Data

Feb. 29, 1992 [DE] Fed. Rep. of Germany ....... 4206431

[51] Int. Cl.$^5$ .............................. B32B 15/08
[52] U.S. Cl. ..................... 428/418; 523/415
[58] Field of Search ................... 523/415; 428/418

[56] References Cited

U.S. PATENT DOCUMENTS

| | | |
|---|---|---|
| 4,167,499 | 9/1979 | Hazan . |
| 4,302,533 | 11/1981 | Frisch et al. . |
| 4,579,886 | 4/1986 | Otsuki et al. ........................ 523/415 |
| 4,639,299 | 1/1987 | Turpin et al. . |

FOREIGN PATENT DOCUMENTS

| | | |
|---|---|---|
| 2010525 | 8/1990 | Canada . |
| 035130 | 9/1981 | European Pat. Off. . |
| 186306 | 2/1986 | European Pat. Off. . |
| 262069 | 3/1988 | European Pat. Off. . |
| 385292 | 2/1990 | European Pat. Off. . |
| 381899 | 8/1990 | European Pat. Off. . |

OTHER PUBLICATIONS

Klempner et al., "Two- and Three-Component Interpenetrating Polymer Networks", 1986, pp. 211-230.
"Interpretating Polymer Networks", Encyclopedia of Polymer Science and Engineering, vol. 8, pp. 279-340, Wiley Intersc publication.

*Primary Examiner*—Melvyn I. Marquis
*Assistant Examiner*—D. Aylward
*Attorney, Agent, or Firm*—Keil & Weinkauf

[57] ABSTRACT

Water-thinnable coating compositions useful in electrocoating comprise
A. a mixture of
  $A_1$. 50–95% by weight of one or more oligomeric or polymeric polyaddition or polycondensation compounds which have on average a molecular weight of from 200 to 20,000 and contain per molecule at least two hydroxyl groups and at least two primary and/or secondary amino groups, and
  $A_2$. 5–50% by weight of a crosslinker that is reactive toward component $A_1$, and
B. a mixture of
  $B_1$. 90–99.9% by weight of one or more radical-polymerizable compounds which have an average molecular weight of from 100 to 10,000 and contain per molecule at least two olefinic double bonds, and
  $B_2$. 0.1–10% by weight of a free radical initiator having a decomposition temperature within the range 50–150° C., the ratio of mixture A to mixture B being from 10:1 to 1:10 and mixture A being substantially chemically inert toward mixture B.

9 Claims, No Drawings

WATER-THINNABLE COATING COMPOSITIONS

The present invention relates to water-thinnable coating compositions comprising A. a mixture of
- A₁. 50–95% by weight of one or more oligomeric or polymeric polyaddition or polycondensation compounds which have on average a molecular weight of from 200 to 20,000 and contain per molecule at least two hydroxyl and at least two primary and/or secondary amino groups, and
- A₂. 5–50% by weight of a crosslinker that reactive toward component A₁, and B. a mixture of
- B₁. 90–99.9% by weight of one or more radical-polymerizable compounds which have an average molecular weight of from 100 to 10,000 and contain per molecule at least two olefinic double bonds, and
- B₂. 0.1–10% by weight of a free radical initiator having a decomposition temperature within the range 50–150° C., the ratio of mixture A to mixture B being from 10:1 to 1:10 and mixture A being substantially chemically inert toward mixture B.

The present invention further relates to aqueous dispersions of such coating compositions and to the use thereof in coating baths for cathodic electrocoating.

U.S. Pat. No. 4,639,299 discloses water-dispersible coatings obtained by polymerization of blocked monoiso-cyanates containing radical-polymerizable double bonds with unsaturated monomers, for example acrylates or styrene, in the presence of amino-epoxy resins.

U.S. Pat. No. 4,167,499 describes graft copolymers formed by grafting a monoepoxide resin onto an acrylate chain, These copolymers are then used together with conventional aminoplast crosslinkers.

EP-A-385 292 discloses cathodically depositable coating compositions in which resins based on butadiene/acrylonitrile copolymers are used mixed with basic epoxy resins and conventional crosslinkers, the curing of which results in the formation of small, independent rubber domains.

EP-A-186 306 discloses self-crosslinking diene-functionally blocked dienophile-functional amine-epoxy resins prepared by reacting diepoxides with an amino-functional diene and dienophile chain extender and secondary amines.

Furthermore, it is common knowledge that interpenetrating, mutually independent polymer networks can be prepared by polymerizing or crosslinking at least one of these networks in the presence of another. These systems have hitherto been used for example in adhesives, impact modified plastics or casting resins (see Interpenetrating Polymer Networks, in Encyclopedia of Polymer Science and Engineering, vol. 8, pp. 279–340, Wiley Interscience Publication).

U.S. Pat. No. 4,302,533 discloses interpenetrating polymer networks composed of at least two different networks, usable for film coatings, adhesives, elastomers, etc., but no aqueous coating compositions are described.

Paint films prepared by cathodic electrocoating should combine the following essential properties:
good corrosion protection
good elasticity.

Prior art systems frequently have only one of the two properties; that is, coatings that have good corrosion protection properties are inelastic, while highly elastic coatings have poor corrosion protection properties.

It is an object of the present invention to make available systems that satisfy both criteria.

We have found that this object is achieved by the water-thinnable coating compositions defined at the beginning, which can be used in electrocoating baths on protonation with acid and dispersing in water.

Suitable for use as component A₁ are oligomeric or polymeric polyaddition or polycondensation compounds which have an average molecular weight of from 200 to 20,000 and which on average carry per molecule at least two hydroxyl groups and at least two primary and/or secondary and/or tertiary amino groups.

These compounds can be for example reaction products of epoxy compounds with primary or secondary amines.

Suitable epoxy compounds are glycidyl ethers of polyphenols containing on average from 2 to 20 hydroxyl groups per molecule, obtainable in a conventional manner by etherification with epihalohydrin in an alkali medium. Examples of suitable phenol compounds are 2,2-bis(4-hydroxyphenyl)propane (bisphenol A), 4,4′-dihydroxybenzophenone, 1,1-bis(4-hydroxyphenyl)ethane, 1,1-bis(4-hydroxyphenyl)isobutane, 2,2-bis(4-hydroxy-tert-butyl-phenyl)propane, bis(4-hydroxynaphthyl)methane and 1,5-dihydroxynaphthalene.

Further suitable epoxy compounds are glycidyl ethers of novolaks, which are likewise obtainable in a conventional manner.

Another suitable class of epoxy compounds are polyglycidyl ethers of saturated polyalcohols, for example ethylene glycol, diethylene glycol, triethylene glycol, 1,2-propylene glycol, 1,3-propanediol, 1,5-pentanediol, 1,2,6-hexanetriol, glycerol or 2,2-bis(4-hydroxycyclohexyl) propane.

It is also possible to use polyglycidyl ethers of saturated polycarboxylic acids.

Suitable epoxy compounds for preparing component A₁ have an average molecular weight $M_n$ of 180–8000 and on average carry at least two epoxy groups per molecule.

Suitable primary or secondary amines which can react with the epoxy groups are for example saturated $C_1$–$C_8$-monoamines such as methylamine, ethylamine, propylamine, isopropylamine or butylamine, dimethylamine, diethylamine, diisopropylamine, methylethylamine, dibutylamine and the like. It is also possible to use saturated $C_2$–$C_6$-alkanolamines such as diethanolamine or methylethanolamine.

The amines mentioned may also carry further functional groups, provided they do not react with the epoxy groups. Further suitable amines are saturated diamines of 2–12 carbon atoms having at most one tertiary amino group, for example ethylenediamine, propylenediamine, butylenediamine, hexamethylenediamine, dimethylaminopropylamine or diethylaminopropylamine.

It is also possible to use amidoamines obtainable in a conventional manner by condensation of saturated primary $C_2$–$C_{12}$-diamines with saturated mono- or dicarboxylic acids. Suitable carboxylic acids are for example adipic acid and dimerized fatty acids such as, for example, dilinolenic acid.

Preferred amino-epoxy resins are reaction products of diglycidyl ethers of bisphenol A with alkanolamines.

Component $A_2$ is a crosslinker which is reactive toward the hydroxyl and amino groups of component $A_1$. Suitable crosslinkers are for example fully blocked polyisocyanate crosslinkers. Suitable isocyanate components are saturated aliphatic or saturated cycloaliphatic or aromatic isocyanates having 2–3 isocyanate groups per molecule, for example hexamethylene diisocyanate, the isocyanurate of hexamethylene diisocyanate, isophorone diisocyanate, toluylene diisocyanate, 4,4'-diphenylmethane diisocyanate (4,4'-MDI) and isomer mixtures of 4,4'-MDI with 2,4'-MDI or 2,2'-MDI.

As blocking agents it is possible to use OH- and NH-functional compounds in a conventional manner.

Preferred blocked isocyanate crosslinkers are n-butylglycol-blocked toluylene diisocyanate, dimerized hexamethylenediisocyanate blocked with dibutylamine, and butylglycol-blocked 4,4'-MDI.

The blocking can be effected in a conventional manner at 30°–100° C. in solvents such as toluene or methyl isobutyl ketone.

Further suitable crosslinker components $A_2$ are phenolic Mannich bases as described in DE-A-34 22 457.

Preferred components $A_2$ are those crosslinkers that are obtained by reacting an aliphatic and an aromatic polyhydroxy compound with an aliphatic and/or cycloaliphatic polyisocyanate and a blocking agent, for example amines. Components of this type are described for example in EP-A-385 293.

Other suitable crosslinkers $A_2$ are the reaction products as described in German Patent Application P 4201054.3, prepared by reacting a reaction product of a hydroxyl-containing epoxy resin and a monofunctional isocyanate with formaldehyde and secondary amines.

Components $A_1$ and $A_2$ are used in such amounts that a mixture of the two contains 5–95% by weight, preferably 30–70% by weight, of $A_1$ and 5–50% by weight, preferably 20–50% by weight, of $A_2$.

Suitable components $B_1$ are monomeric, oligomeric or polymeric radical-polymerizable compounds having an average molecular weight $M_w$ of 200–10,000 which contain at least two olefinic double bonds per molecule and are substantially chemically inert toward the mixture A.

Suitable compounds within this definition are for example the diesters of saturated $C_2$–$C_{10}$-diols and acrylic acid or methacrylic acid such as ethylene glycol diacrylate or dimethacrylate, propylene glycol diacrylate or dimethacrylate, 1,4-butanediol diacrylate or dimethacrylate. It is also possible to use the divinyl ethers of saturated $C_2$–$C_{10}$-diols.

It is similarly possible to use reaction products of saturated $C_2$–$C_{10}$-polyols with glycidyl acrylate or glycidyl methacrylate where all the hydroxyl functions have reacted with the corresponding glycidyl groups, for example a reaction product of 1 mol of trimethylolpropane and 3 mol of glycidyl methacrylate.

Furthermore, it is also possible to use polymeric compounds that are obtainable in a conventional manner by polymerization of the aforementioned monomers and contain at least two unconverted olefinic double bonds.

Similarly, compounds obtainable by complete reaction of the epoxy groups of a polyepoxide with hydroxylalkyl (meth)acrylates are suitable for use as component $B_1$. Suitable hydroxyalkyl (meth)acrylates are the monoesters of $C_2$–$C_{10}$-diols and acrylic or methacrylic acid, for example 2-hydroxyethyl acrylate or methacrylate, 3-hydroxypropyl acrylate or methacrylate, 2-hydroxypropyl acrylate or methacrylate or 4-hydroxybutyl acrylate or methacrylate.

The polyepoxy compound used can be any desired material having in particular an average molecular weight of from 200 to 6000 and containing on average from 1.5 to 3.0 epoxy groups per molecule, preferably compounds containing 2 epoxy groups per molecule. Preference is given to epoxy resins having average molecular weights of from 350 to 5000, in particular from 350 to 2000. Particularly preferred epoxy resins are for example glycidyl ethers of polyphenols containing on average at least 2 phenolic hydroxyl groups in the molecule, preparable in a conventional manner by etherification with an epihalohydrin in the presence of alkali. Examples of suitable phenol compounds are 2,2-bis(4-hydroxyphenyl)propane (bisphenol A), 4,4'-dihydroxybenzophenone, 1,1-bis-(4hydroxyphenyl)ethane, 1,1-bis(4-hydroxyphenyl)isobutane, 2,2-bis(4-hydroxy-tert-butylphenyl)propane, bis(4-hydroxynaphthyl)methane and 1,5-dihydroxynaphthalene. In some cases it is desirable to use aromatic epoxy resins having a higher molecular weight. They are obtained by reacting the abovementioned diglycidyl ethers with a polyphenol, for example 2,2-bis(4-hydroxyphenyl)propane, and then further reacting the resulting products with epichlorohydrin to prepare polyglycidyl ethers.

Another suitable class of epoxy resins are polyglycidyl ethers of phenolic novolak resins, which make it possible to increase the functionality from 2 to about 6 glycidyl groups per molecule. Also suitable are polyglycidyl ethers of polyhydric alcohols, as of ethylene glycol, diethylene glycol, triethylene glycol, 1,2-propylene glycol, 1,3-propanediol, 1,5-pentanediol, 1,2,6-hexanetriol, glycerol and 2,2-bis(4-hydroxycyclohexyl)propane. It is also possible to use polyglycidyl esters of polycarboxylic acids.

Further suitable components $B_1$ are acrylate- or methacrylate-modified polyurethanes. Suitable polyisocyanates for preparing the polyurethane precursors are in particular aromatic polyisocyanates such as 4,4'-diphenylmethane diisocyanate or positional isomers thereof, or mixtures of these isomers, toluylene diisocyanate or 1,5-naphththyl diisocyanate, but also aliphatic or cycloaliphatic isocyanates such as hexamethylene diisocyanate or isophorone diisocyanate. Suitable polyols are polyhydric alcohols such as ethylene glycol, diethylene glycol, triethylene glycol, 1,2-propylene glycol, 1,4-butanediol or trimethylolpropane, or else polyesterols such as reaction products of trimethylolpropane and $\epsilon$-caprolactone.

The preparation of polyurethanes is known per se. The mixing ratios and the control procedure for the reaction are chosen in such a way that each polyurethane molecule has at least two free isocyanate groups available for reaction with a hydroxyalkyl acrylate or methacrylate. The modification with acrylate can be carried out under generally known conditions.

Preferred components $B_1$ are polyacrylates formed from reaction products of glycidyl methacrylate and trimethylolpropane, and also (meth) acrylate-modified polyurethanes.

Suitable components $B_2$ are free-radical initiators having a decomposition temperature of 50°–150° C., preferably 80°–130° C., e.g. di-tert-butyl peroctoate or dibutyl perbenzoate.

Components $B_1$ and $B_2$ are used in such amounts that a mixture of the two contains 90–99.9% by weight, preferably 95–99% by weight, of $B_1$ and 0.1–10% by weight, preferably 1–5% by weight, of $B_2$.

In the coating compositions of the invention, the ratio of mixture A to mixture B is 10:1–1:10, preferably 10:1–1:1.

Also, mixture A should be substantially chemically inert toward mixture B.

The coating compositions of the invention are preferably used in the form of an aqueous dispersion.

To prepare these dispersions, components $A_1$, $A_2$, $B_1$ and $B_2$ are usually intimately mixed at room temperature and then protonated with an acid. Suitable acids are organic acids such as acetic acid, propionic acid or lactic acid and inorganic acids such as phosphoric acid.

The amount of acid used is determined to be such that 20–80%, preferably 25–60%, of the protonatable groups present in the resin are neutralized.

The mixture is then heated to 40°–50° C. and diluted with water, added with stirring, and organic solvent still present is distilled off at 80 mbar and 40°–50° C. as an azeotrope with water. Thereafter water is added to adjust the solids content to 5–50% by weight, preferably 10–40% by weight, particularly preferably 20–35% by weight.

These aqueous dispersions are then used for preparing coating baths for cathodic electrocoating.

Such electrocoating baths contain the coating compositions of the invention in amounts of 5–30, preferably 10–25, % by weight, based on the total solids content.

Furthermore, the coating baths may additionally contain pigment pastes and customary auxiliaries. Pigment pastes are obtainable for example from a grinding resin and pigments such as titanium dioxide, carbon black or aluminum silicates and also auxiliaries and dispersants.

In cathodic electrocoating the paint films are customarily deposited at 20°–40° C., preferably 25°–35° C., in the course of 60–300 s at a deposition voltage of 50–500 V. The article to be coated is connected as cathode.

The coats thus deposited can then be baked at 80°–200° C., preferably 120°–180° C.

The coatings of the invention possess good elasticity and high corrosion resistance and are therefore highly suitable for use as primers for automobile body shells.

Preparation of component $A_1$

EXAMPLE 1

678.4 g of a diglycidyl ether based on bisphenol A and having an epoxy equivalent weight of 1380 were dissolved at 100° C. in 500 g of methyl isobutyl ketone and 330 g of a hydrocarbon fraction with a boiling point of 100° C. (Solvesso 100 from Exxon). The reaction mixture was then cooled down and thereafter, at about 70° C., 126 g of dibutylamine were added dropwise in such a way that the temperature did not exceed 70° C. and the reaction mixture was additionally stirred at 70° C. for 2 hours. The product thus obtained had a solids content of 47.5% by weight and a viscosity of 125 mPa.s at 25° C. The polymer had an OH number of 106 mg of KOH/g of solid substance, an amine number of 34.9 mg of KOH/g of solid substance and an average molecular weight $M_w$ of 3800.

Preparation of component $A_2$

EXAMPLE 2

570.3 g of trimerized hexamethylene diisocyanate were dissolved in 208 g of methyl isobutyl ketone, and 261 g of methyl ethyl ketoxime were added dropwise over 1 hour. The mixture was subsequently stirred until the NCO value had dropped to 0. The product had a solids content of 80% by weight.

EXAMPLE 3

10,000 g of isophorone diisocyanate were dissolved in 2500 g of toluene, 10.0 g of dibutyltin dilaurate were added, and the mixture was heated to 60° C. Then a solution of 804 g of trimethylolpropane and 3078 g of bisphenol A in 1234 g of toluene and 1234 g of methyl isobutyl ketone was added dropwise in such a way that the reaction temperature did not exceed 60° C.

The reaction mixture was then held at 60° C. for 1.5 hours and thereafter diluted with 3350 g of toluene, at which point 5805 g of dibutylamine were added dropwise at 80° C. over 1 hour. The reaction mixture was then stirred until the NCO value had decreased to 0. The product had a solids content of 70% by weight and a K value (3 % strength in N-methylpyrrolidone) of 12.3.

Preparation of component $B_1$

EXAMPLE 4

A mixture of 134.2 g of trimethylolpropane 0.35 g of hydroquinone and 430.5 g of glycidyl methacrylate was gradually heated to 80° C. and then stirred until the epoxy value had dropped to 0. The polymer thus obtained had a viscosity of 860 mPa.s at 25° C. and an average molecular weight $M_w$ of 580.

EXAMPLE 5

A mixture of 100.5 g of a reaction product of 134.2 g of trimethylolpropane and 348 g of caprolactone, having a molecular weight of 490, 262.4 g of 4,4'-diphenylmethane diisocyanate and 500 g of methyl isobutyl ketone was heated to 40° C., treated with 0.1 g of dibutyltin dilaurate and held at 65°–70° C. until the NCO value had decreased to 9.0. Then 0.1 g of hydroquinone were added at 60° C., followed by the gradual dropwise addition of 130.2 g of hydroxyethyl methacrylate.

The mixture was then stirred at 60° C. until the NCO value had decreased to 0.

The polymer solution thus obtained had a solids content of 53.6% by weight and a viscosity of 1.08 Pa.s at 25° C., and the average molecular weight $M_w$ of the polymer was 6500.

Component $B_2$:

The free-radical initiator used was di-tert-butyl peroctoate. The amounts used in each case are listed in Table I.

Preparation of pigment pastes 640 g of a diglycidyl ether based on bisphenol A and epichlorohydrin and having an epoxy equivalent weight of 485 and 160 g of another such diglycidyl ether with an epoxy equivalent weight of 188 were mixed at 100° C. A further vessel was charged with 452 g of hexamethylenediamine, the contents were heated to 100° C., and 720 g of the above resin mixture were added in the course of an hour, during which slight cooling was necessary in order to hold the temperature at 100° C. After a further 30 minutes excess hexamethylenediamine was stripped off under reduced pressure by raising the temperature, the conditions at the end of the distillation being a temperature of 205° C. and a pressure of 30 mbar. Then 57.6 g of stearic acid, 172.7 g of dimeric fatty acid and 115 g of xylene were added. The water of reaction was then distilled off azeotropically at 175°-180° C. in the course of 90 minutes. Subsequently the residue was diluted with 58 g of butylglycol and 322 g of isobutanol. The product had a solids content of 70% and a viscosity, measured with a plate-cone viscometer at 75° C., of 2240 mPa.s.

110 g of the synthetic resin thus obtained were ball milled with 36 g of ethylene glycol monobutyl ether, 3 g of acetic acid, 170 g of titanium dioxide, 18 g of lead silicate, 4.5 g of carbon black and 170 g of water to a particle fineness of <7 μm.

Preparation of electrocoating baths I-X

Initially the amounts of components $A_1$ to $B_2$ listed in Table I were intimately mixed at room temperature. After the particular amount of acetic acid specified had been added, the mixture was heated to 50° C. and 850 g of water were added. Then organic solvent was distilled off as an azeotrope with water at 40°-50° C. and 70-90 mbar. Thereafter water was added to adjust the solids contents of the dispersions to 35% by weight.

The dispersions were mixed with the pigment paste (amounts see Table I) and then diluted with sufficient water to produce a solids content of 20% by weight within a bath volume of 5 l.

The electrocoating baths were stirred at 30° C. for 168 hours. Cathodically connected zinc phosphatized test panels made of steel were then coated for 120 seconds. The coatings were then baked at 165° C. for 25 min.

The coating conditions and the test results are listed in Table II.

pounds which have on average a molecular weight of from 200 to 20,000 and contain per molecule at least two hydroxyl groups and at least two primary and/or secondary amino groups, and $A_2$. 5-50% by weight of a crosslinker that is reactive toward component $A_1$, and B. a mixture of $B_1$. 90-99.9% by weight of one or more radical-polymerizable compounds which have an average molecular weight of from 100 to 10,000 and contain per molecule at least two olefinic double bones, and $B_2$. 0.1-10% by weight of a free radical initiator having a decomposition temperature within the range 50°-150° C., the ratio of mixture A to mixture B being from 10:1 to 1:10 and mixture A being substantially chemically inert toward mixture B.

2. A composition as defined in claim 1 wherein component $A_1$ is an amino-epoxy resin.

3. A composition as defined in claim 1 wherein component $A_2$ is a blocked polyisocyanate crosslinker.

4. A composition as defined in claim 1 wherein component $A_2$ is a phenolic Mannich base.

5. A composition as defined in claim 1 wherein component $B_1$ is a polyacrylate.

6. An aqueous dispersion containing 5-50% by weight, based on the total solids content, of a coating composition as defined in claim 1.

7. An electrocoating bath for cathodic electrocoating containing 5-30% by weight of a coating composition as defined in claim 1.

8. An electrocoating bath as defined in claim 7 additionally containing pigment paste and auxiliaries.

9. A coated article obtained by cathodic ceposition of a coating composition as defined in claim 1.

TABLE I

| Bath No. | $A_1$ | $A_2$, Ex. 2 | $A_2$, Ex. 3 | $B_1$, Ex. 4 | $B_1$, Ex. 5 | $B_2$ | Acetic acid | Pigment paste |
|---|---|---|---|---|---|---|---|---|
| I | 638 | 190 | | 195 | | 3.9 | 10.7 | 640 |
| II | 547 | 163 | | 260 | | 5.2 | 10.1 | 640 |
| III | 638 | 190 | | | 195 | 3.9 | 10.7 | 640 |
| IV | 547 | 163 | | | 260 | 5.2 | 10.1 | 640 |
| V | 730 | | 216 | 130 | | 2.6 | 11.1 | 640 |
| VI | 638 | | 190 | 195 | | 3.9 | 10.6 | 640 |
| VII | 547 | | 163 | 260 | | 5.2 | 10.2 | 640 |
| VIII | 730 | | 216 | | 130 | 2.6 | 11.1 | 640 |
| IX | 638 | | 190 | | 195 | 3.9 | 10.6 | 640 |
| X | 548 | | 163 | | 260 | 5.2 | 10.2 | 640 |

TABLE II

| Bath No. | Voltage [V] | Paint film thickness [mm] | Reverse impact[1] [N/m$^2$] | Erichsen indentation[2] [mm] | Rusting in cycling test[3] [mm] |
|---|---|---|---|---|---|
| I | 330 | 24 | 2.26 | 6.1 | 1.4 |
| II | 310 | 23 | 6.79 | 6.9 | 1.4 |
| III | 330 | 24 | 6.79 | 7.1 | 1.2 |
| IV | 320 | 22 | 15.84 | 7.8 | 1.6 |
| V | 350 | 25 | 6.79 | 6.9 | 1.4 |
| VI | 330 | 24 | 13.58 | 7.8 | 1.2 |
| VII | 330 | 25 | >18.1 | 8.5 | 1.4 |
| VIII | 350 | 25 | 6.79 | 7.0 | 1.5 |
| IX | 340 | 25 | 18.1 | 8.0 | 1.5 |
| X | 330 | 24 | >18.1 | 9.1 | 1.4 |

[1] according to ASTM D 2794
[2] Erichsen indentation according to ISO 1520
[3] 10 cycles of atmosphere cycling test, underpenetration at score in accordance with DIN 50 021.

We claim:

1. A water-thinnable coating composition consisting essentially of

A. a mixture of $A_1$. 50-95% by weight of one or more oligomeric or polymeric polyaddition or polycondensation com-

* * * * *

UNITED STATES PATENT AND TRADEMARK OFFICE
CERTIFICATE OF CORRECTION

PATENT NO.: 5,352,525

DATED: October 4, 1994

INVENTOR(S): HUEMKE et al.

It is certified that error appears in the above-identified patent and that said Letters Patent is hereby corrected as shown below:

On the title page, item [75] Inventors:
   "Durkheim" should read -- Duerkheim --

Claim 9, column 8, line 64:
   "ceposition" should read -- deposition --

Signed and Sealed this

Fifteenth Day of November, 1994

Attest:

BRUCE LEHMAN

*Attesting Officer*     *Commissioner of Patents and Trademarks*